US010636378B2

(12) United States Patent
Wu

(10) Patent No.: US 10,636,378 B2
(45) Date of Patent: Apr. 28, 2020

(54) SCAN SIGNAL COMPENSATING METHOD BASED ON REFERENCE THIN FILM TRANSISTORS, AND SCAN SIGNAL COMPENSATING CIRCUIT AND DISPLAY DEVICE ASSOCIATED THEREWITH

(71) Applicant: Xianyang Caihong Optoelectronics Technology Co., Ltd, Xianyang (CN)

(72) Inventor: Yuan-Liang Wu, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 16/225,092

(22) Filed: Dec. 19, 2018

(65) Prior Publication Data

US 2019/0197978 A1 Jun. 27, 2019

(30) Foreign Application Priority Data

Dec. 21, 2017 (CN) .......................... 2017 1 1392018

(51) Int. Cl.
*G06F 3/041* (2006.01)
*G09G 3/36* (2006.01)
*G09G 3/20* (2006.01)

(52) U.S. Cl.
CPC ............. *G09G 3/3677* (2013.01); *G09G 3/20* (2013.01); *G09G 3/3696* (2013.01); *G09G 2300/0426* (2013.01); *G09G 2300/0819* (2013.01); *G09G 2310/027* (2013.01); *G09G 2310/0267* (2013.01); *G09G 2310/0286* (2013.01); *G09G 2310/0289* (2013.01); *G09G 2320/0247* (2013.01); *G09G 2370/08* (2013.01)

(58) Field of Classification Search
CPC . G06F 2203/04101; G06F 2203/04805; G06F 3/023; G06F 3/041; G06F 3/0412; G06F 3/0418; G06F 3/0482; G06F 3/04842; G06F 3/0488; G06F 3/04886; G06F 3/04895; H04M 1/00; H04M 1/23; H04M 2250/22
See application file for complete search history.

(56) References Cited

U.S. PATENT DOCUMENTS

2007/0052646 A1* 3/2007 Ishiguchi ............. G09G 3/3648 345/92
2012/0153996 A1* 6/2012 Su ......................... G09G 3/3659 327/109
2013/0328576 A1* 12/2013 Jamal ..................... G09G 3/006 324/681

* cited by examiner

*Primary Examiner* — Ram A Mistry
(74) *Attorney, Agent, or Firm* — WPAT, PC

(57) ABSTRACT

A scan signal compensating method, a scan signal compensating circuit and a display device are provided. The compensating method includes: disposing a reference TFT; obtaining a drain current of the reference TFT; acquiring a compensation voltage value according to the drain current; and performing voltage compensation to a GOA driving circuit according to the compensation voltage value. By disposing the reference TFT to acquire a drift of I-V characteristic curve of a certain TFT of the GOA driving circuit, obtaining the compensation voltage value according to a drifted drain current of the reference TFT and compensating a driving voltage of the GOA driving circuit, the problem of display image sticking or flickering caused by the drift of I-V characteristic curve of the TFT in the GOA driving circuit resulting from a long-term bias voltage can be solved consequently.

14 Claims, 4 Drawing Sheets

SCAN SIGNAL COMPENSATING METHOD BASED ON REFERENCE THIN FILM TRANSISTORS, AND SCAN SIGNAL COMPENSATING CIRCUIT AND DISPLAY DEVICE ASSOCIATED THEREWITH

FIELD OF THE DISCLOSURE

The disclosure relates to the field of display technologies, and more particularly to a scan signal compensating method, a scan signal compensating circuit and a display device.

BACKGROUND

With the development of thin film transistor liquid crystal display (TFT-LCD) devices, the competition of liquid crystal products has become more and more fierce, and various manufacturers begin to develop new technologies to occupy the market. The technology of gate driver on array (GOA) integrates a gate driver on a glass substrate to perform the function of panel scan. Due to its low cost, low power consumption, narrow border and other advantages, it has gradually become a new research direction of manufacturers. In the development of GOA technology, most focus on the research of driving circuits to solve problems of large-size and high-resolution applications.

Referring to FIG. 1 and FIG. 2, FIG. 1 is a schematic structural view of a TFT in a GOA area provided by a related art, and FIG. 2 is a schematic view of I-V characteristic curves of a certain selected TFT in the GOA area provided by a related art. For the properties of the amorphous silicon TFT itself, as long as there is a voltage difference between the gate and the source/drain for a long time, the I-V characteristic of the TFT is changed, that is, the drain current $I_D$ drifts under the same gate-source voltage $V_{GS}$. For the GOA area, in practical applications of using the amorphous silicon TFT, the gate-source voltage is kept at a low level and the source-drain voltage is kept at a high level for a long time, which will affect a charging state of pixel resulting from the drift of a scan driving voltage output from a scan driving circuit, thereby affecting the display effect of liquid crystal panel, for example, a phenomenon of residual image may appear.

SUMMARY

In order to overcome the above problems in related art, the disclosure provides a scan signal compensating method, a scan signal compensating circuit, and a display device.

In an embodiment, a scan signal compensating method is provided. The compensating method is adapted for a GOA driving circuit and includes following steps of:

setting at least one reference TFT; obtaining at least one drain current of the at least one reference TFT; acquiring at least one compensation voltage value according to the drain current; and performing voltage compensation to the GOA driving circuit according to the at least one compensation voltage value.

In an embodiment, the at least one reference TFT includes a first reference TFT, a second reference TFT and a third reference TFT.

In an embodiment, the step of obtaining at least one drain current of the at least one reference TFT includes: in a working mode, according to voltage values of sources, drains and gates of a first TFT, a second TFT and a third TFT, applying voltages on sources, drains and gates of the first reference TFT, the second reference TFT and the third reference TFT with a same ratio relative to the respective voltage values of the sources, the drains and the gates of the first, the second, and the third TFTs; and obtaining drain currents of the first reference TFT, the second reference TFT and the third reference TFT.

In an embodiment, the at least one compensation voltage value includes a first DC voltage adjustment value, a second DC voltage adjustment value and a third DC voltage adjustment value; correspondingly, the step of acquiring at least one compensation voltage value according to the at least one drain current includes: searching a look-up table according to drain currents of the first reference TFT, the second reference TFT and the third reference TFT to acquire the first DC voltage adjustment value, the second DC voltage adjustment value and the third DC voltage adjustment value.

In an embodiment, the look-up table includes a mapping relationship between the drain currents of the first through third reference TFTs and the first DC voltage adjustment value, a mapping relationship between the drain currents of the first through third reference TFTs and the second DC voltage adjustment value, and a mapping relationship between the drain currents of the first through third reference TFTs and the third DC voltage adjustment value. Moreover, the mapping relationships are expressed as that:

$$\begin{cases} dV_{T1/2}\_vg1 = f_1(I_{D1}, I_{D2}, I_{D3}); \\ dQ\_vss1 = f_2(I_{D1}, I_{D2}, I_{D3}); \\ dQ\_vss2 = f_2(I_{D1}, I_{D2}, I_{D3}); \end{cases}$$

where $dV_{T1/2}\_vg1$ refers to the first DC voltage adjustment value, dQ_vss1 refers to the second DC voltage adjustment value, dQ_vss2 refers to the third DC voltage adjustment value, $I_{D1}$ refers to the drain current of the first reference TFT, $I_{D2}$ refers to the drain current of the second reference TFT, and $I_{D3}$ refers to the drain current of the third reference TFT.

In an embodiment, the at least one compensation voltage value includes a first DC voltage adjustment value and a second DC voltage adjustment value; correspondingly, the step of acquiring at least one compensation voltage value according to the at least one drain current includes: searching a look-up table according to drain currents of the first reference TFT, the second reference TFT and the third reference TFT to acquire the first DC voltage adjustment value and the second DC voltage adjustment value.

In an embodiment, the look-up table includes a mapping relationship between the drain currents of the reference TFTs and the first DC voltage adjustment value, and a mapping relationship between the drain currents of the reference TFTs and the second DC voltage adjustment value. Moreover, the mapping relationships are expressed as that:

$$\begin{cases} dV_{T1/2}\_vg1 = f_1(I_{D1}, I_{D2}, I_{D3}); \\ dQ\_vss = f_2(I_{D1}, I_{D2}, I_{D3}); \end{cases}$$

where $dV_{T1/2}\_vg1$ refers to the first DC voltage adjustment value, dQ_vss refers to the second DC voltage adjustment value, $I_{D1}$ refers to the drain current of the first reference TFT, $I_{D2}$ refers to the drain current of the second reference TFT, and $I_{D3}$ refers to the drain current of the third reference TFT.

The disclosure further provides a scan signal compensating circuit. The compensating circuit is electrically connected to a GOA driving circuit and includes: a current detecting module configured to obtain at least one drain current of at least one reference TFT; a compensation voltage acquiring module configured to acquire at least one compensation voltage value according to the at least one drain current; and a compensating module configured to perform voltage compensation on the GOA driving circuit according to the at least one compensation voltage value.

In an embodiment, the at least one reference TFT includes a first reference TFT, a second reference TFT and a third reference TFT; and the first through third reference TFTs are disposed in a dummy area outside an active area as well as a GOA area of a display device equipped with the GOA driving circuit in the GOA area.

In an embodiment, the current detecting module includes a level converting unit and a drain current sensing unit. The level converting unit is configured to, in a working mode, according to voltage values of sources, drains and gates of a first TFT, a second TFT and a third TFT in the GOA driving circuit, apply voltages on sources, drains and gates of the first through third reference TFTs with a same ratio relative to the respective voltage values of the sources, the drains and the gates of the first through third TFTs. The drain current sensing unit is configured to obtain drain currents of the first through third reference TFTs.

The disclosure further provides a display device. The display device includes a GOA driving circuit and any one of the scan signal compensating circuits as described in above embodiments.

In the embodiments of the disclosure, by disposing the reference TFT(s) to acquire the drift(s) of I-V characteristic curve of a TFT(s) of the GOA driving circuit, obtaining the compensation voltage value(s) according to a drifted drain current(s) of the reference TFT(s) and compensating a driving voltage(s) of the GOA driving circuit, the problems of display image sticking and flickering caused by the drift(s) of I-V characteristic curve of the TFT(s) in the GOA driving circuit resulting from a long-term bias voltage can be solved consequently.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the drawings.

DETAILED DESCRIPTION OF PREFERRED EMBODIMENTS

Figure 1:
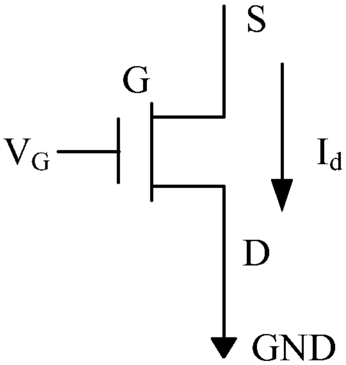
FIG. 1 (Related Art)
FIG. 1 is a schematic structural view of a TFT in a GOA area in related art.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Embodiment 1

Figure 3:
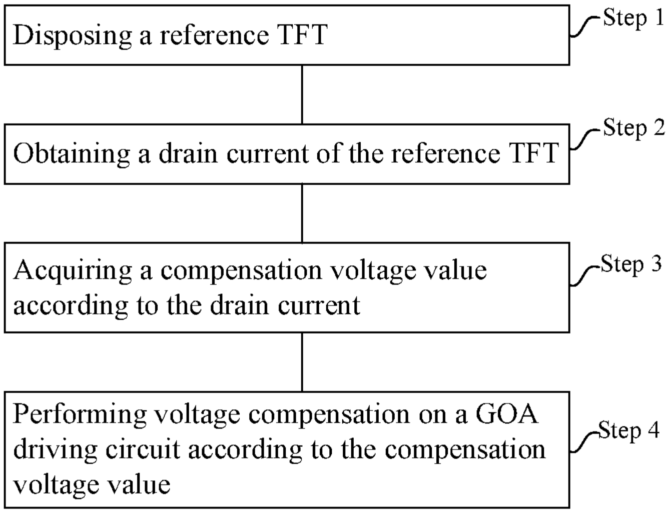
FIG. 3 is a schematic flowchart of a scan signal compensating method according to an embodiment of the disclosure.

Please refer to FIG. 3, and FIG. 3 is a schematic flowchart of a scan signal compensating method according to an embodiment of the disclosure. The compensating method is suitable for TFT-LCD display devices, and its working principle is also applicable to other display devices such as LED display devices, OLED display devices or the like. The compensating method can effectively solve the problem that the pixel charging is insufficient caused by a drift of I-V characteristic resulting from a TFT in a GOA area suffering from a long-term bias voltage. Specifically, the scan signal compensating method may include following steps including Step 1 through Step 4.

Step 1: disposing a reference TFT.

Step 2: obtaining a drain current of the reference TFT.

Step 3: obtaining a compensation voltage value according to the drain current.

Step 4: performing voltage compensation on a GOA driving circuit according to the compensation voltage value.

In this embodiment, the reference TFT is set to obtain the drift of I-V characteristic curve of a TFT in the GOA driving circuit, the compensation voltage value is obtained according to a drift value of the drain current, and then the driving voltage of the GOA circuit is compensated, which can solve the problem of display image blur or flicker caused by the drift of I-V characteristic curve resulting from the TFT in the GOA driving circuit suffering from a long-term bias voltage.

Embodiment 2

Figure 4:
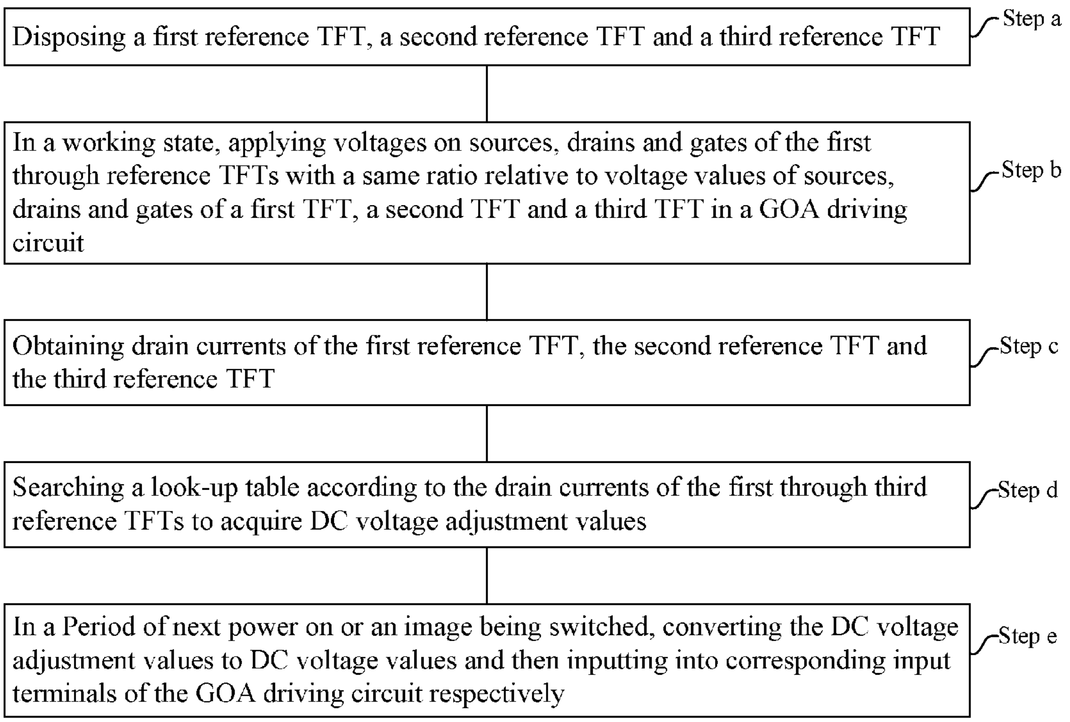
FIG. 4 is a schematic flowchart of a scan signal compensating method according to another embodiment of the disclosure.
Figure 5:
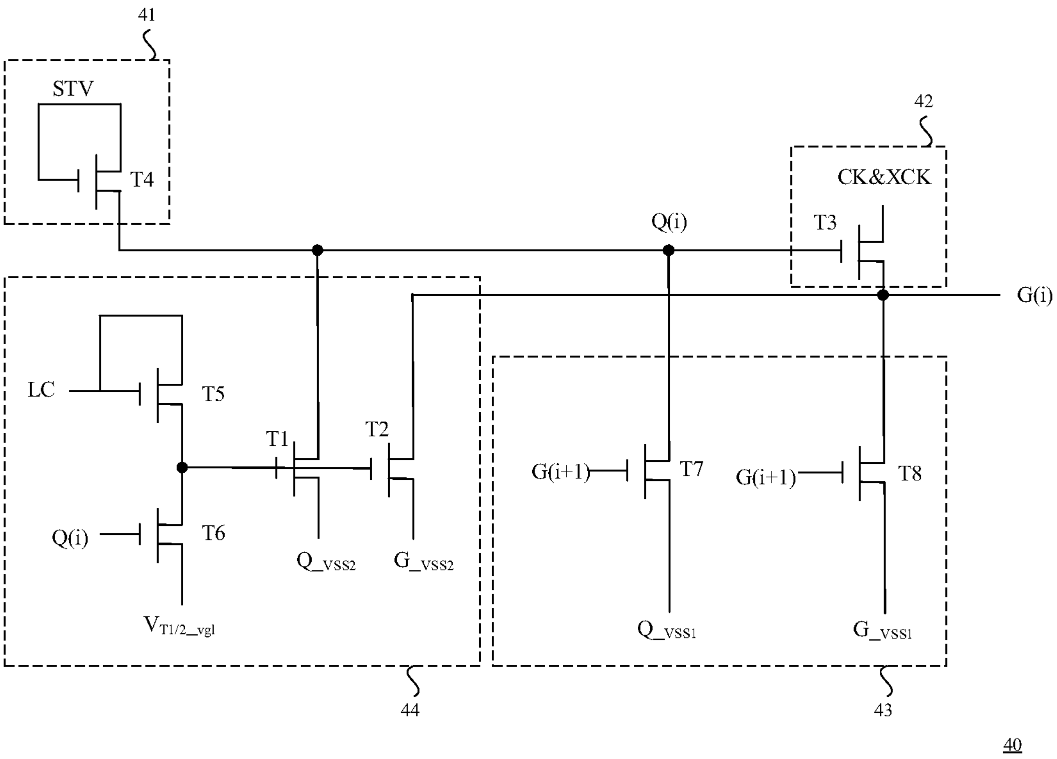
FIG. 5 is a schematic structural view of a GOA driving circuit according to an embodiment of the disclosure.
Figure 6:
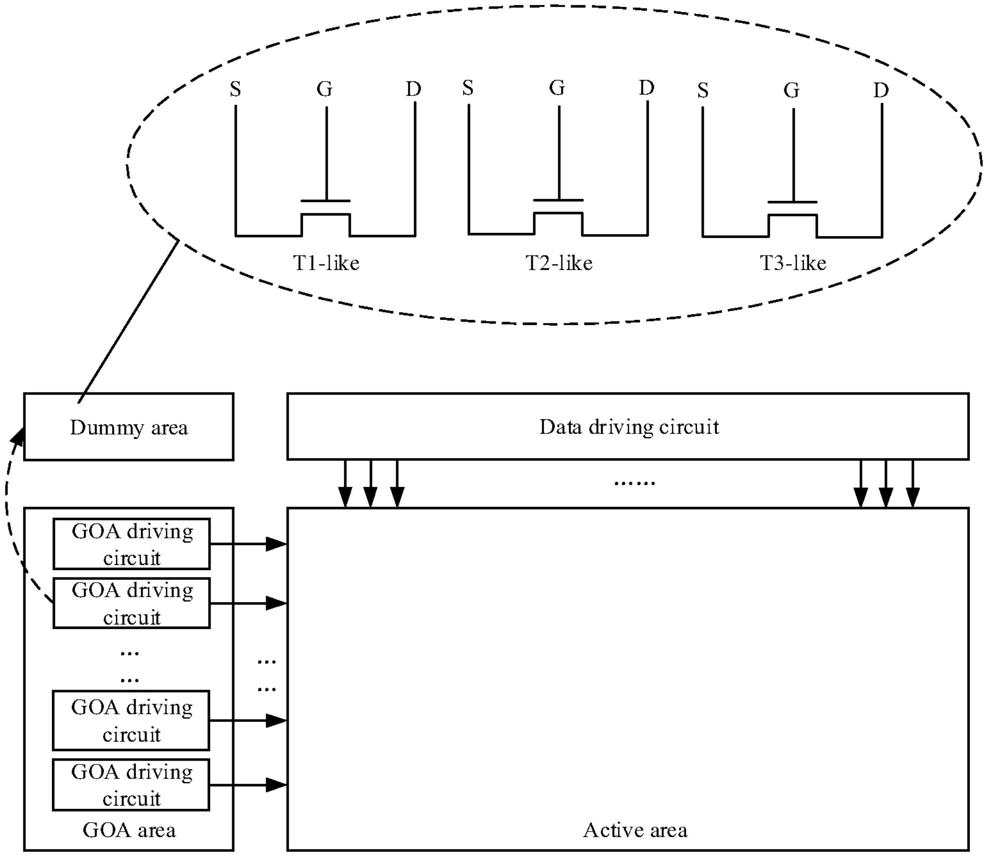
FIG. 6 is a schematic view showing an arrangement of reference TFTs according to an embodiment of the disclosure.

Referring to FIG. 4, FIG. 5 and FIG. 6, FIG. 4 is a schematic flowchart of a scan signal compensating method according to another embodiment of the disclosure, FIG. 5 is a schematic structural view of a GOA driving circuit according to an embodiment of the disclosure, and FIG. 6 is a schematic view showing an arrangement of reference TFTs according to an embodiment of the disclosure. Based on the above embodiment, this embodiment focuses on a working principle of the scan signal compensating method, and details thereof will be described as follows. Specifically, the compensating method may include following steps including Step a through Step e.

Step a: disposing a first reference TFT, a second reference TFT and a third reference TFT outside an active area and a GOA area.

In particular, the first reference TFT T1-like, the second reference TFT T2-like, and the third reference TFT T3-like are disposed in an area outside the active area and the GOA area. For example, as shown in FIG. 6, these reference TFTs may be arranged in a dummy area, and the reference TFTs are used for simulating TFTs in the GOA driving circuit 40 suffering from a long-term bias voltage (gate-source bias voltage Vgs, gate-drain bias voltage Vgd, or drain-source bias voltage Vds).

More specifically, as shown in FIG. 5, the GOA driving circuit 40 mainly includes a pull-up control unit 41, a pull-up unit 42, a pull-down unit 43 and a pull-down maintaining unit 44. The pull-up control unit 41 mainly includes a fourth TFT T4 and is configured (i.e., structured and arranged) to receive a scan signal of a preceding 1st or Nth stage of GOA driving circuit and generate a scan control signal Q(i) for controlling the operation of the pull-up unit 42. The pull-up unit 42 mainly includes a third TFT T3 and is configured to transmit a pixel turn-on voltage VGH, formed by clock signals CK&XCK (for example, CK1~CKN, XCK1~XCKN) under the control of the scan control signal Q(i), to a scan line G(i). The pull-down unit 43 mainly includes a seventh TFT T7 and an eighth TFT T8 and is configured to transmit a turn-off voltage VGL formed by a direct current (DC) source voltage value VSS to the scan line G(i), under the control of a succeeding stage of scan driving signal. The pull-down maintaining unit 44 mainly includes a first TFT T1, a second TFT T2, a fifth TFT T5 and a sixth TFT T6 and is configured to keep the first TFT T1 and the second TFT T2 in an ON state under the control of a low-frequency signal LC so as to maintain the scan control signal Q(i) and a signal on the scan line G(i) both at low voltage levels.

Figure 2:
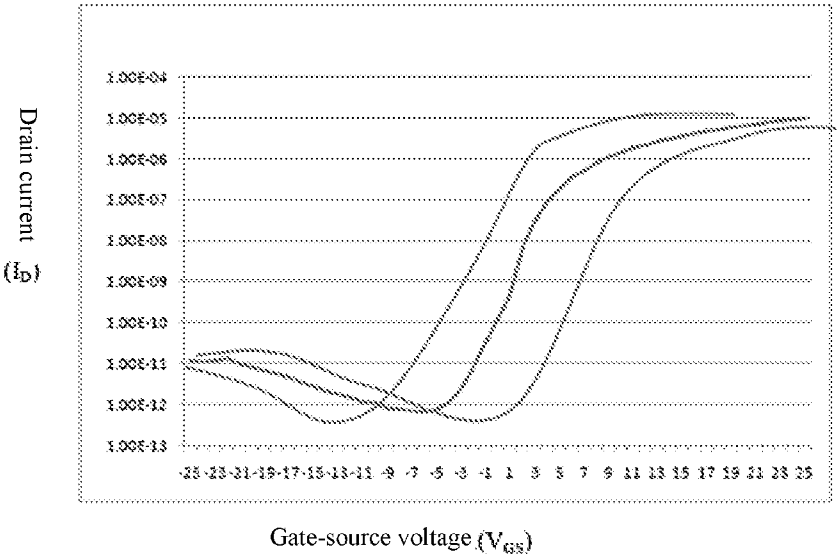
FIG. 2 (Related Art)
FIG. 2 is a schematic view showing I-V characteristic curves of a certain selected TFT in the GOA area in related art.

After analysis, the TFTs suffered from a long-term bias voltage especially large bias voltage in the GOA area mainly include the first TFT T1, the second TFT T2 and the third TFT T3, and voltage parameters related thereto mainly include the clock signals CK&XCK, the low frequency signal LC and the DC source voltage value VSS. The working states of gates, drains and sources of the first TFT T1, the second TFT T2 and the third TFT T3 can be estimated/deduced by the input clock signals CK&XCK, the low frequency signal LC and the DC source voltage value VSS. That is, states of these TFTs under bias voltages can be determined by estimation/deduction. Since the long-term bias voltages will affect drain currents $I_D$ of these TFTs, as shown in FIG. 2, they will directly affect a voltage amplitude of a driving signal output by the scan line G(i). That is, the turn-on voltage VGH and the turn-off voltage VGL will be changed in some degree, thereby affecting the charging of pixels in the active area.

Based on this, the first reference TFT T1-like, the second reference TFT T2-like and the third reference TFT T3-like are disposed to simulate working conditions of the first TFT T1, the second TFT T2 and the third TFT T3 respectively.

Step b: in a working mode, according to voltage values of the sources, the drains and the gates of the first TFT, the second TFT and the third TFT in the GOA driving circuit, applying voltages on sources, drains and gates of the first reference TFT, the second TFT and the third TFT with a same ratio relative to the respective voltage values of the sources, the drains and the gates of the first TFT, the second TFT and the third TFT in the GOA driving circuit.

Herein, the voltages with the same ratio may be the same as the respective voltage values of the sources, the drains and the gates of the first TFT, the second TFT and the third TFT in the GOA driving circuit, i.e., the ratio is 100%; or, the voltages with the same ratio may be larger than or smaller than the respective voltage values of the sources, the drains and the gates of the first TFT, the second TFT and the third TFT in the GOA driving circuit, i.e., the ratio is larger than or less than 100%. Preferably, since the voltages applied on the gates, the drains and the sources of the first TFT T1, the second TFT T2 and the third TFT T3 are relatively small, in order to more conveniently simulate the working states of these TFTs, the first reference TFT T1-like, the second reference TFT T2-like, and the third reference TFT T3-like may be applied with voltages being proportionally increased relative to the respective voltages applied on the first TFT T1, the second TFT T2 and the third TFT T3.

In addition, a device parameter(s) of these reference TFTs may not be exactly the same as that of the TFTs to be simulated, such as the size of TFT, in the case of the device parameter(s) having relatively small influence on driving voltage and driving current. Of course, it can be understood that, the device parameters of these reference TFTs are exactly the same as that of the TFTs to be simulated is the best option.

Step c: obtaining drain currents of the first reference TFT T1-like, the second reference TFT T2-like and the third reference TFT T3-like.

Step d: searching a look-up table (LUT) according to the drain currents of the first reference TFT T1-like, the second reference TFT T2-like and the third reference TFT T3-like to obtain DC voltage adjustment values.

In particular, the LUT is preset in a memory of the display device before the display device leaves the factory. The LUT includes a mapping relationship between the drain currents of the reference TFTs and a first DC voltage adjustment value $dV_{T1/2}$_vg1, a mapping relationship between the drain currents of the reference TFTs and a second DC voltage adjustment value dQ_vss1, and a mapping relationship between the drain currents of the reference TFTs and a third DC voltage adjustment value dQ_vss2. The mapping relationships can be described as the following expressions that:

$$\begin{cases} dV_{T1/2}\_\text{vg1} = f_1(I_{D1}, I_{D2}, I_{D3}); \\ \text{dQ\_vss1} = f_2(I_{D1}, I_{D2}, I_{D3}); \\ \text{dQ\_vss2} = f_2(I_{D1}, I_{D2}, I_{D3}); \end{cases}$$

Where $dV_{T1/2}$_vg1 refers to the first DC voltage adjustment value, dQ_vss1 refers to the second DC voltage adjustment value, dQ_vss2 refers to the third DC voltage adjustment value, $I_{D1}$ refers to the drain current of the first reference TFT T1-like, $I_{D2}$ refers to the drain current of the second reference TFT T2-like, and $I_{D3}$ refers to the drain current of the third reference TFT T3-like.

In an alternative embodiment, for the GOA circuit shown in FIG. 5, a second DC voltage input terminal (the terminal for input Q_vss1) and a third DC voltage input terminal (the terminal for input Q_vss2) can be provided by a same DC voltage source, and the DC voltage source provides a DC voltage value such as Q_vss, that means Q_vss=Q_vss1=Q_vss2. In this situation, the mapping relationships can be described as the following expressions that:

$$\begin{cases} dV_{T1/2}\_\text{vg1} = f_1(I_{D1}, I_{D2}, I_{D3}); \\ \text{dQ\_vss} = f_2(I_{D1}, I_{D2}, I_{D3}); \end{cases}$$

Where $dV_{T1/2}$_vg1 refers to the first DC voltage adjustment value, dQ_vss refers to a second DC voltage adjustment value, $I_{D1}$ refers to the drain current of the first reference TFT T1-like, $I_{D2}$ refers to the drain current of the second reference TFT T2-like, and $I_{D3}$ refers to the drain current of the third reference TFT T3-like.

Step e: in a period of next power on or an image being switched, the DC voltage adjustment values are respectively converted into DC voltage values and then are input into corresponding input terminals of the GOA driving circuit respectively.

Specifically, the adjustments of the DC voltage values of the DC sources may be performed during a period from power on to power off. That is, during the period from power on to power off, the drain currents of the first reference TFT T1-like, the second reference TFT T2-like and the third reference TFT T3-like are detected, and then voltage adjustment values are determined according to the LUT, and when the next power on, the adjustments of the DC voltage values output from the DC sources are started immediately, and the adjustments are completed before the active area starts displaying. Of course, the adjustments of the DC voltage values of the DC sources also can be performed in real time during the power on process, for example, during the display device being powered on, an image being switched or a signal source being switched, there is no restriction herein. It should be understood that the adjustments performed after one time of power on and off have a relatively better effect.

In this embodiment, the LUT is pre-stored and used to find the voltage adjustment values according to the detected drain currents of the reference TFTs, and then flexible adjustments of the DC voltage values are realized, which can solve the problems of image sticking and flicker caused by the drifts of I-V curves of TFTs in the GOA driving circuit.

Embodiment 3

Figure 7:
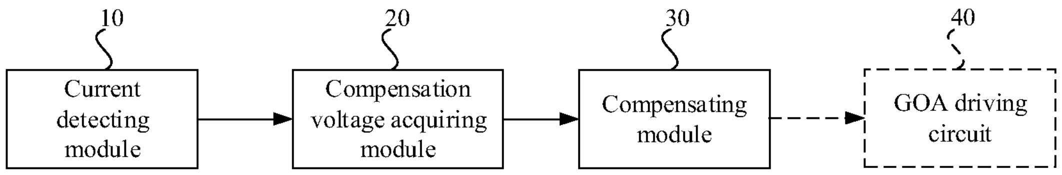
FIG. 7 is a schematic block diagram of a scan signal compensating circuit according to an embodiment of the disclosure.
Figure 8:
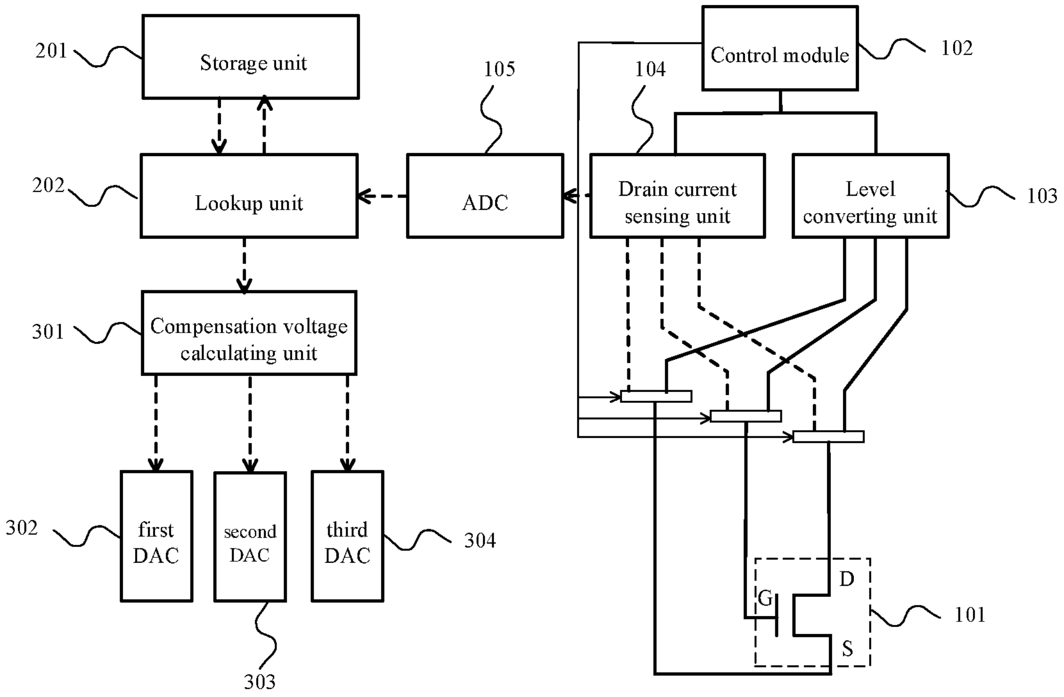
FIG. 8 is another schematic block diagram of the scan signal compensating circuit according to an embodiment of the disclosure.
Figure 9:
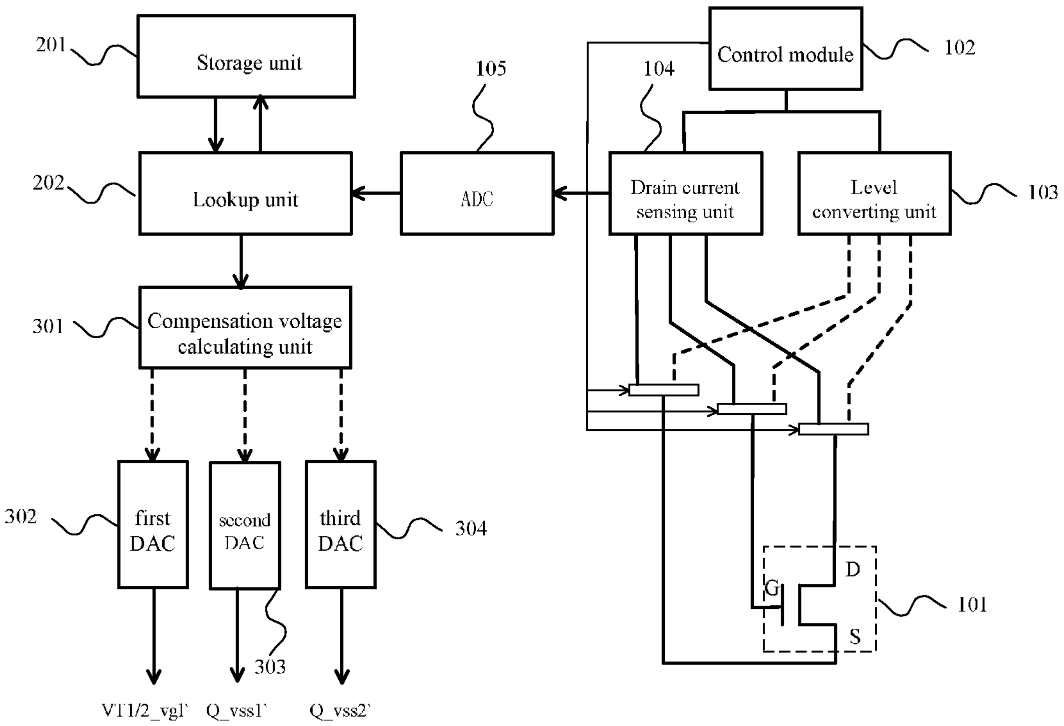
FIG. 9 is still another schematic block diagram of the scan signal compensating circuit according to an embodiment of the disclosure.

Referring to FIG. 7, FIG. 8 and FIG. 9, FIG. 7 is a schematic block diagram of a scan signal compensating circuit according to an embodiment of the disclosure, FIG. 8 is another schematic block diagram of the scan signal compensating circuit according to an embodiment of the disclosure, and FIG. 9 is still another schematic block diagram of the scan signal compensating circuit according to an embodiment of the disclosure. On the basis of the above-mentioned embodiments, the working principle of the scan driving signal compensating circuit of the embodiment of the disclosure is described below in detail by taking that the reference TFT is disposed in a dummy area and the voltage adjustments are performed at the next power on as an example.

In particular, the scan signal compensating circuit includes a current detecting module 10, a compensation voltage acquiring module 20 and a compensating module 30. The current detecting module 10 is configured to obtain a drain current(s) of a reference TFT(s). The compensation voltage acquiring module 20 is configured to obtain a compensation voltage value(s) according to the drain current(s). The compensating module 30 is configured to perform voltage compensation on the GOA driving circuit according to the compensation voltage value(s).

More specifically, the current detecting module 10 may include a reference TFT 101 (e.g., the first reference TFT T1-like, the second reference TFT T2-like, or the third reference TFT T3-like), a control module (also referred to as controller like MCU, DSP) 102, a level converting unit (also referred to as level shifter) 103, a drain current sensing unit (also referred to as drain current sensor) 104, and an analog-to-digital converter (ADC) 105. The control module 102 is connected to the drain current detecting unit 104 and the level converting unit 103 individually. The reference TFT 101 is connected to the drain current sensing unit 104 and the level converting unit 103 via a MUX switcher. The drain current sensing unit 104 is connected to the ADC 105.

The compensation voltage acquiring module 20 may include a storage unit 201 and a lookup unit 202. The lookup unit 202 is connected to the ADC 105. The storage unit 201 is connected to the lookup unit 202. The storage unit 201 stores a look-up table. The storage unit 201 can be, for example, a ROM or a non-volatile memory (NVM). Moreover, in an exemplary embodiment, the lookup unit 202 may be embodied/implemented in a processing circuit such as a processor.

The compensation module 30 may include a compensation voltage calculating unit 301, a first digital-to-analog converter (DAC) 302, a second DAC 303 and a third DAC 304. The compensation voltage calculating unit 301 is connected to the lookup unit 202. Moreover, in an exemplary embodiment, the lookup unit 202 of the compensation voltage acquiring module 20 and the compensation voltage calculating unit 301 of the compensation module 30 are embodied/implemented in a same processing circuit such as a processor.

More specifically, the scan signal compensating circuit includes two working modes, e.g., a display mode and a detection compensation mode. FIG. 8 corresponds to the display mode, and FIG. 9 corresponds to the detection compensation mode.

Furthermore, a working principle of the scan signal compensating circuit according to the embodiment of the disclosure is described in detail as follows.

In the display mode, the control module 102 controls the level converting unit 103 to output voltages on a source S, a drain D and a gate G of the reference TFT 101 and makes driving manners of the reference TFT 101 and a corresponding TFT in the GOA area be approximately the same. That is, voltages applied on the source S, the drain D and the gate G of the first reference TFT T1-like are approximately the same as voltages of a source, a drain and a gate of the first TFT T1 in the GOA area respectively; voltages applied on the source S, the drain D and the gate G of the second reference TFT T2-like are approximately the same as voltages of a source, a drain and a gate of the second TFT T2 in the GOA area respectively; voltages applied on the source S, the drain D and the gate G of the third reference TFT T3-like are approximately the same as voltages of a source, a drain and a gate of the third TFT T3 in the GOA area respectively. Therefore, the I-V curve drift behavior of the reference TFT 101 has a certain similarity to that of the corresponding TFT in the GOA area.

In an alternative embodiment, voltages applied on the reference TFT 101 may be set as follows. The voltages applied on the source S, the drain D and the gate G of the reference TFT 101 may be respectively set to be an average value of source voltages, an average value of drain voltages and an average value of gate voltages of to-be-simulated TFTs of the GOA driving circuits in the GOA area corresponding to all scan lines; or, voltages applied on the source S, the drain D and the gate G of the reference TFT 101 may be respectively set to be a source voltage, a drain voltage and a gate voltage of one to-be-simulated TFT of the GOA driving circuit in the GOA area corresponding to a certain one scan line.

In the display mode, the control module 102 controls the drain current sensing unit 104 to be in a non-working state (e.g., inactive state). At this time, the drain current sensing unit 104 has no output, so that the ADC 105, the compensation voltage acquiring module 20 and the compensating module 30 all are at inactive states.

In the detection compensation mode, the control module 102 controls the driving circuit sensing unit 104 to supply the reference TFT 101 with voltages on the source S, the drain D and gate G being same as a source voltage, a drain voltage and a gate voltage used when establishing the look-up table. Meanwhile, the drain current sensing unit 104 detects the drain current of the reference TFT 101. The ADC 105, the compensation voltage acquiring module 20 and the compensating module 30 all are in working states (e.g., active states). The ADC 105 converts the drain current into a digital signal. The lookup unit 202 obtains the digital signal and obtains a first DC voltage adjustment value $dV_{Tl/2_}$vg1, a second DC voltage adjustment value dQ_vss1 and a third DC voltage adjustment value dQ_vss2 as per mapping relationships saved in the lookup table stored in the storage unit 201. In another exemplary embodiment, a first DC voltage adjustment value dVT1/2_vg1 and a second DC voltage adjustment value dQ_vss (dQ_vss=dQ_vss1=dQ_vss2) are obtained by the lookup unit 202.

The first DC voltage adjustment value $dV_{T1/2_}$vg1, the second DC voltage adjustment value dQ_vss1 and the third DC voltage adjustment value dQ_vss2 are sent to the compensation voltage calculating unit 301, and then are processed by the compensation voltage calculating unit 301 to produce a first DC voltage value $V_{T1/2_}$Vg1'=$V_{T1/2_Vg}$1+$dVT_{1/2_vg}$1, a second DC voltage value Q_vss1'=Q_vss1+dQ_vss1, and a third DC voltage value Q_vss2'=Q_vss2+dQ_vss2. These DC voltage values respectively are converted by the first DAC 302, the second DAC 303 and the third DAC 304 into analog signals, and the analog signals are input into three input terminals of the GOA driving circuit respectively.

In addition, an embodiment of the disclosure further provides a display device. The display device includes a GOA driving circuit(s) and the scan signal compensating circuit as described in the above embodiment. The scan signal compensating circuit is used to implement any one of the scan signal compensating methods as described in the foregoing embodiments. The implementation manner is consistent with the foregoing manner and thus will not be repeated herein.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A scan signal compensating method adapted for a gate driver on array (GOA) driving circuit, wherein the compensating method comprises:

disposing at least one reference thin film transistor (TFT);

obtaining at least one drain current of the at least one reference TFT;

acquiring at least one compensation voltage value according to the at least one drain current; and performing voltage compensation to the GOA driving circuit according to the at least one compensation voltage value;

wherein the at least one reference TFT comprises a first reference TFT, a second reference TFT and a third reference TFT;

wherein obtaining at least one drain current of the at least one reference TFT comprises: in a working mode, according to voltage values of sources, drains and gates of a first TFT, a second TFT and a third TFT in the GOA driving circuit, applying voltages on sources, drains and gates of the first reference TFT, the second reference TFT and the third reference TFT with a same ratio relative to the respective voltage values of the sources, the drains and the gates of the first through third TFTs; and obtaining drain currents of the first reference TFT, the second reference TFT and the third reference TFT.

2. The compensating method according to claim 1, wherein the at least one compensation voltage value comprises a first direct current (DC) voltage adjustment value, a second DC voltage adjustment value and a third DC voltage adjustment value; correspondingly acquiring at least one compensation voltage value according to the at least one drain current comprises:

searching a look-up table according to drain currents of the first reference TFT, the second reference TFT and the third reference TFT to acquire the first DC voltage adjustment value, the second DC voltage adjustment value and the third DC voltage adjustment value.

3. The compensating method according to claim 2, wherein the look-up table comprises a mapping relationship between the drain currents of the first through third reference TFTs and the first DC voltage adjustment value, a mapping relationship between the drain currents of the first through third reference TFTs and the second DC voltage adjustment value, and a mapping relationship between the drain currents of the first through third reference TFTs and the third DC voltage adjustment value; and the mapping relationships are expressed as that:

$$\begin{cases} dV_{T1/2}\_vg1 = f_1(I_{D1}, I_{D2}, I_{D3}); \\ dQ\_vss1 = f_2(I_{D1}, I_{D2}, I_{D3}); \\ dQ\_vss2 = f_2(I_{D1}, I_{D2}, I_{D3}); \end{cases}$$

where dVT1/2_vg1 refers to the first DC voltage adjustment value, dQ_vss1 refers to the second DC voltage adjustment value, dQ_vss2 refers to the third DC voltage adjustment value, ID1 refers to the drain current of the first reference TFT, ID2 refers to the drain current of the second reference TFT, and ID3 refers to the drain current of the third reference TFT.

4. The compensating method according to claim 1, wherein the at least one compensation voltage value comprises a first DC voltage adjustment value and a second DC voltage adjustment value; correspondingly acquiring at least one compensation voltage value according to the at least one drain current comprises:

searching a look-up table according to drain currents of the first reference TFT, the second reference TFT and the third reference TFT to acquire the first DC voltage adjustment value and the second DC voltage adjustment value.

5. The compensating method according to claim 4, wherein the look-up table comprises a mapping relationship between the drain currents of the first through third reference TFTs and the first DC voltage adjustment value, and a mapping relationship between the drain currents of the first through third reference TFTs and the second DC voltage adjustment value; and the mapping relationships are expressed as that:

$$\begin{cases} dV_{T1/2}\_vg1 = f_1(I_{D1}, I_{D2}, I_{D3}); \\ dQ\_vss = f_2(I_{D1}, I_{D2}, I_{D3}); \end{cases}$$

where dVT1/2_vg1 refers to the first DC voltage adjustment value, dQ_vss refers to the second DC voltage adjustment value, ID1 refers to the drain current of the first reference TFT, ID2 refers to the drain current of the second reference TFT, and ID3 refers to the drain current of the third reference TFT.

6. A scan signal compensating circuit electrically connected to a GOA driving circuit, wherein the compensating circuit comprises:

a current detecting module, configured to obtain at least one drain current of at least one reference TFT;

a compensation voltage acquiring module, configured to acquire at least one compensation voltage value according to the at least one drain current; and a compensating module, configured to perform voltage compensation on the GOA driving circuit according to the at least one compensation voltage value;

wherein the at least one reference TFT comprises a first reference TFT, a second reference TFT and a third reference TFT; and the first through third reference TFTs are disposed in a dummy area outside an active area as well as a GOA area of a display device equipped with the GOA driving circuit in the GOA area;

wherein the current detecting module comprises: a level converting unit, configured to, in a working mode, according to voltage values of sources, drains and gates of a first TFT, a second TFT and a third TFT in the GOA driving circuit, apply voltages on sources, drains and gates of the first through third reference TFTs with a same ratio relative to the respective voltage values of the sources, the drains and the gates of the first through third TFTs; and a drain current sensing unit, configured to obtain drain currents of the first through third reference TFTs.

7. A display device comprising a GOA driving circuit and a scan signal compensating circuit electrically connected to the GOA driving circuit; wherein the compensating circuit comprises:

a current detecting module, configured to obtain at least one drain current of at least one reference TFT;

a compensation voltage acquiring module, configured to acquire at least one compensation voltage value according to the at least one drain current; and a compensating module, configured to perform voltage compensation on the GOA driving circuit according to the at least one compensation voltage value;

wherein the at least one reference TFT comprises a first reference TFT, a second reference TFT and a third reference TFT; the first through third reference TFTs are disposed in a dummy area outside an active area as well as a GOA area of the display device; and the GOA driving circuit is in the GOA area;

wherein the current detecting module comprises: a level converting unit, configured to, in a working mode, according to voltage values of sources, drains and gates of a first TFT, a second TFT and a third TFT in the GOA driving circuit, apply voltages on sources, drains and gates of the first through third reference TFTs with a same ratio relative to the respective voltage values of the sources, the drains and the gates of the first through third TFTs; and a drain current sensing unit, configured to obtain drain currents of the first through third reference TFTs.

8. The display device according to claim 7, wherein the same ratio is larger than 100%.

9. The display device according to claim 7, wherein the at least one compensation voltage value comprises a first DC voltage adjustment value, a second DC voltage adjustment value and a third DC voltage adjustment value; and the compensation voltage acquiring module comprises:

a storage unit, stored with a look-up table; and a lookup unit, configured to search the look-up table according to drain currents of the first through third reference TFTs to acquire the first DC voltage adjustment value, the second DC voltage adjustment value and the third DC voltage adjustment value.

10. The display device according to claim 9, wherein the look-up table comprises a mapping relationship between the drain currents of the first through third reference TFTs and the first DC voltage adjustment value, a mapping relationship between the drain currents of the first through third reference TFTs and the second DC voltage adjustment value, and a mapping relationship between the drain currents of the first through third reference TFTs and the third DC voltage adjustment value; and the mapping relationships are expressed as that:

$$\begin{cases} dV_{T1/2}\_vg1 = f_1(I_{D1}, I_{D2}, I_{D3}); \\ dQ\_vss1 = f_2(I_{D1}, I_{D2}, I_{D3}); \\ dQ\_vss2 = f_2(I_{D1}, I_{D2}, I_{D3}); \end{cases}$$

where dVT1/2_vg1 refers to the first DC voltage adjustment value, dQ_vss1 refers to the second DC voltage adjustment value, dQ_vss2 refers to the third DC voltage adjustment value, ID1 refers to the drain current of the first reference TFT, ID2 refers to the drain current of the second reference TFT, and ID3 refers to the drain current of the third reference TFT.

11. The display device according to claim 7, wherein the at least one compensation voltage value comprises a first DC voltage adjustment value and a second DC voltage adjustment value; and the compensation voltage acquiring module comprises:

a storage unit, stored with a look-up table; and a lookup unit, configured to search the look-up table according to drain currents of the first through third reference TFTs to acquire the first DC voltage adjustment value and the second DC voltage adjustment value;

wherein the look-up table comprises a mapping relationship between the drain currents of the first through third reference TFTs and the first DC voltage adjustment value, and a mapping relationship between the drain currents of the first through third reference TFTs and the second DC voltage adjustment value; and the mapping relationships are expressed as that:

$$\begin{cases} dV_{T1/2}\_vg1 = f_1(I_{D1}, I_{D2}, I_{D3}); \\ dQ\_vss = f_2(I_{D1}, I_{D2}, I_{D3}); \end{cases}$$

where dVT1/2_vg1 refers to the first DC voltage adjustment value, dQ_vss refers to the second DC voltage adjustment value, ID1 refers to the drain current of the first reference TFT, ID2 refers to the drain current of the second reference TFT, and ID3 refers to the drain current of the third reference TFT.

12. The display device according to claim 7, wherein the at least one compensation voltage value comprises a plurality of DC voltage adjustment values; and the compensating module comprises:

a compensation voltage calculating unit, configured to produce a plurality of DC voltage values according to the plurality of DC voltage adjustment values respectively;

digital-to-analog converters (DACs), configured to convert the plurality of DC voltage values into a plurality of analog signals and input the plurality of analog signals respectively to input terminals of the GOA driving circuit.

13. The display device according to claim 7, wherein the GOA driving circuit comprises a pull-up control unit, a pull-up unit, a pull-down unit and a pull-down maintaining unit all connected together; the pull-down maintaining unit comprises the first TFT and the second TFT; and the pull-up unit comprises the third TFT connected to a scan line.

14. The display device according to claim 13, wherein the pull-up control unit comprises a fourth TFT configured to generate a scan control signal;

wherein the third TFT is configured to transmit a turn-on voltage formed by clock signals to the scan line under the control of the scan control signal;

wherein the pull-down unit comprises a seventh TFT and an eighth TFT and is configured to transmit a turn-off voltage formed by a DC source voltage value to the scan line;

wherein the pull-down maintaining unit further comprises a fifth TFT and a sixth TFT and is configured to keep the first TFT and the second TFT in an ON state under the control of a low-frequency signal and thereby maintain the scan control signal and a signal on the scan line both at low levels.

* * * * *